United States Patent
Wolfgang et al.

(10) Patent No.: US 8,982,982 B2
(45) Date of Patent: Mar. 17, 2015

(54) JOINT CARRIER RECOVERY FOR MIMO SYSTEMS

(75) Inventors: Andreas Wolfgang, Torslanda (SE); Lei Bao, Göteborg (SE); David Carling, Mölndal (SE); Edvin Catovic, Göteborg (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 14/116,364

(22) PCT Filed: Jun. 8, 2011

(86) PCT No.: PCT/EP2011/059496
§ 371 (c)(1),
(2), (4) Date: Nov. 8, 2013

(87) PCT Pub. No.: WO2012/167823
PCT Pub. Date: Dec. 13, 2012

(65) Prior Publication Data
US 2014/0086350 A1    Mar. 27, 2014

(51) Int. Cl.
*H04B 7/02* (2006.01)
*H04B 7/04* (2006.01)
*H04L 27/00* (2006.01)

(52) U.S. Cl.
CPC .......... *H04B 7/0413* (2013.01); *H04L 27/0014* (2013.01)
USPC .............................. 375/267; 375/259; 375/260

(58) Field of Classification Search
CPC .......................... H04B 7/0413; H04L 27/0014
USPC .................................. 375/260, 316, 259, 267
See application file for complete search history.

(56) References Cited

U.S. PATENT DOCUMENTS

| | | | |
|---|---|---|---|
| 5,062,123 A | | 10/1991 | Geile et al. |
| 5,475,710 A | * | 12/1995 | Ishizu et al. .................. 375/232 |
| 7,173,990 B2 | * | 2/2007 | Kim et al. ..................... 375/347 |
| 8,111,770 B1 | * | 2/2012 | Moon et al. ................... 375/267 |
| 8,433,544 B2 | * | 4/2013 | Wright et al. ................. 702/190 |
| 8,537,285 B2 | * | 9/2013 | Silver et al. .................. 348/731 |
| 2007/0253599 A1 | * | 11/2007 | White et al. .................. 382/107 |
| 2009/0296846 A1 | * | 12/2009 | Maru ............................. 375/267 |

FOREIGN PATENT DOCUMENTS

EP    2020766 A1    2/2009

* cited by examiner

*Primary Examiner* — Dhaval Patel
(74) *Attorney, Agent, or Firm* — Coats & Bennett, P.L.L.C.

(57) ABSTRACT

The invention relates to a method for carrier recovery of an equalized communications signal in a multiple-input multiple-output communications system. The method is comprised of the steps generating a phase rotation estimate from the equalized communications signal and a demodulated signal estimate of the equalized communications signal, and adjusting at least one of the phase and frequency of the equalized communications signal based on the phase rotation estimate. The step of generating the phase rotation estimate further comprising using a model based filter with the equalized communications signal as input signal to the model based filter and the demodulated signal estimate as a measurement to the model based filter.

18 Claims, 6 Drawing Sheets

JOINT CARRIER RECOVERY FOR MIMO SYSTEMS

TECHNICAL FIELD

The present invention relates to the field of carrier recovery in wireless communications systems and, in particular, to joint carrier recovery in Multiple-Input Multiple-Output (MIMO) communications systems.

BACKGROUND

In communications systems, carrier recovery is used for estimation and compensation of faults, such as carrier phase and frequency offset, which occurs between a received communications signal's carrier wave and the receiver's local oscillator. The concept of carrier recovery is well known in the art and widely used in wireless communication systems.

Algorithms for carrier recovery used in Single-Input Single-Output (SISO) communications systems can generally also be directly applied to Multiple-Input Multiple-Output (MIMO) communications systems as long as all transmitters share the same oscillator and correspondingly all receivers are clocked by a common oscillator. However, in communications systems where all transmitters and receivers are clocked by independent oscillators, existing carrier recovery solutions cannot be utilized. The case is further complicated if time-asynchronous transmission from all antennas is considered, and the channel transfer function is frequency selective.

SUMMARY OF THE INVENTION

With the above description in mind, then, an aspect of the present invention is to provide an improved method and apparatus for carrier recovery in a MIMO communications system which seeks to mitigate, alleviate, or eliminate one or more of the above-identified deficiencies in the art and disadvantages singly or in any combination.

A first aspect of the present invention relates to a method for carrier recovery of an equalized communications signal in a multiple-input multiple-output communications system, the method comprising generating a phase rotation estimate from said equalized communications signal and a demodulated signal estimate of said equalized communications signal, adjusting at least one of the phase and frequency of said equalized communications signal based on said phase rotation estimate, wherein that said step of generating said phase rotation estimate comprising using a model based filter with said equalized communications signal as input signal to said model based filter and said demodulated signal estimate as a measurement to said model based filter.

The method may further comprise applying a second model based filter to said model based filter, wherein the phase rotation estimate from said model based filter is used as a-priori information to said second model based filter and wherein said second model based filter producing an improved phase rotation estimate as said phase rotation estimate.

The method wherein said model based filter may be realized using an extended Kalman filter.

The method wherein said second model based filter may be realized using a second extended Kalman filter.

The method wherein said model based filter may be realized using one of: unscented Kalman filter, Least Mean Squares with projection, and Recursive Least Squares.

The method wherein the method may further comprise applying a smoother to said extended Kalman filter, generating a smoothened phase rotation estimate as said phase rotation estimate.

The method wherein the smoothing in said smoother may be performed using fixed-point smoothing.

The method wherein the smoothing in said smoother may be performed using fixed-lag smoothing.

The method wherein said multiple-input multiple-output communications system may be a line-of-sight multiple-input multiple-output communications system.

A second aspect of the present invention relates to an apparatus for carrier recovery of an equalized communications signal in a multiple-input multiple-output communications system, comprising means for generating a phase rotation estimate from said equalized communications signal and a demodulated signal estimate of said equalized communications signal, means for adjusting at least one of the phase and frequency of said equalized communications signal based on said phase rotation estimate, wherein said means for generating said phase rotation estimate comprises a model based filter unit with said equalized communications signal as input signal to said model based filter unit and said demodulated signal estimate as a measurement to said model based filter unit.

The apparatus may further comprise of a second model based filter unit adapted to receive said phase rotation estimate from said model based filter unit and use said received phase rotation estimate as a-priori information for said second model based filter unit, and wherein said second model based filter unit is further adapted to produce an improved phase rotation estimate as said phase rotation estimate.

The apparatus wherein said model based filter unit may comprise an extended Kalman filter unit.

The apparatus wherein said second model based filter unit may comprise a second extended Kalman filter.

The apparatus wherein said model based filter unit may comprise one of unscented Kalman filter unit, Least Mean Squares with projection unit, and Recursive Least Squares unit.

The apparatus wherein the apparatus may further comprise a smoother unit adapted to smoothen the phase rotation estimate generated by said extended Kalman filter unit, and to output a smoothened phase rotation estimate as said phase rotation estimate.

The apparatus wherein the smoothing in said smoother unit may be performed using fixed-point smoothing.

The apparatus wherein the smoothing in said smoother unit may be performed using fixed-lag smoothing.

The apparatus wherein said apparatus may be adapted to be used in a line-of-sight multiple-input multiple-output communications system.

Any of the features above in the first and second aspect of the present invention above may be combined in any way possible.

BRIEF DESCRIPTION OF THE DRAWINGS

Further objects, features, and advantages of the present invention will appear from the following detailed description of some embodiments and variants of the invention, wherein some embodiments or variants of the invention will be described in more detail with reference to the accompanying drawings, in which.

DETAILED DESCRIPTION

Embodiments of the present invention will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference signs refer to like elements throughout.

The invention, and embodiments and variants thereof, will now be described using a 4-by-4 dual polarization (DP) Line-of-Sight (LoS) Multiple-Input Multiple-Output (MIMO) system as an example.

Figure 1:
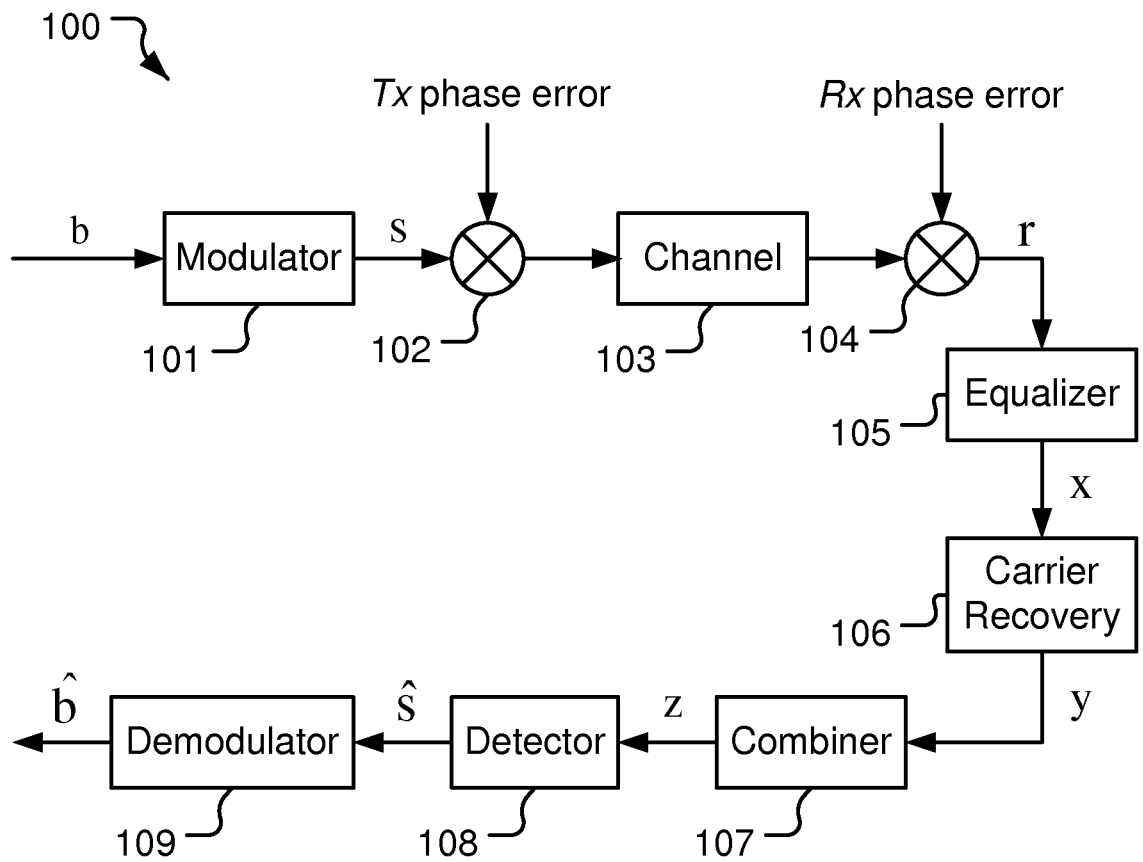
FIG. 1 shows a block diagram of a basic communications system employing carrier recovery.

FIG. 1 shows a block diagram of a LoS MIMO system model 100 where $s=[s_1\ s_2\ s_3\ s_4]$ are the QPSK-modulated 101 binary source bit $b_i$, $i \in \{1, 2, 3, 4\}$, one for each antenna, which are transmitted over a LoS MIMO channel 103. The received signal $r=[r_1\ r_2\ r_3\ r_4]$ at the receiver, affected by channel distortion and transmitter 102 and receiver phase errors 104, may then be modeled as, $$r = f(\Phi^r, \Phi^t, H, s) + n^h = \Phi^r H \Phi^t s + n^h, \quad (1)$$

where $\Phi^r$ and $\Phi^t$ represent are diagonal matrices which represent the phase errors introduced by the transmitter 102 and the receiver oscillators 104, H denotes the channel matrix, and the vector $n^h$ denotes additive white Gaussian noise with a covariance matrix $Q^h$.

Figure 2:
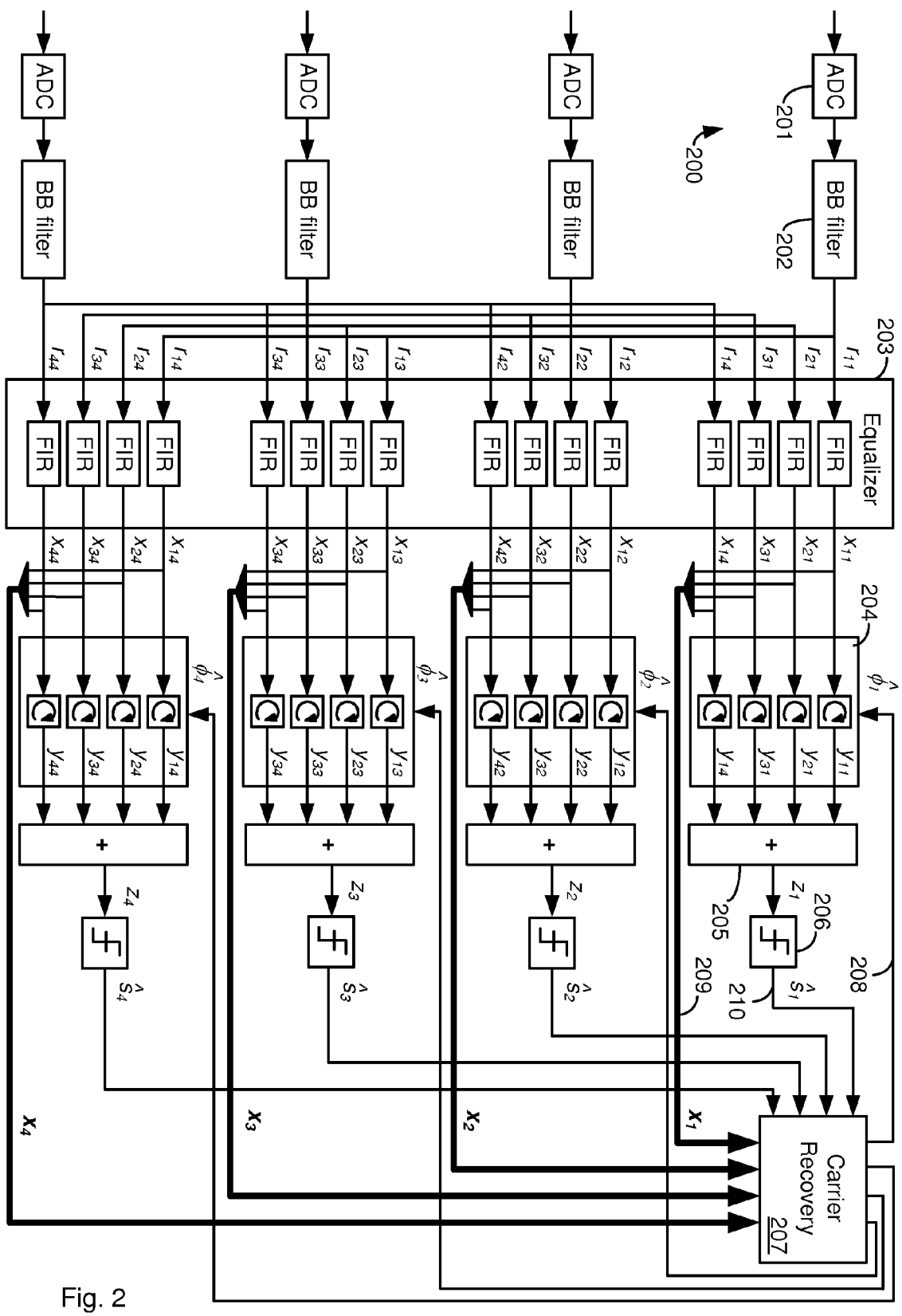
FIG. 2 shows a block diagram of a receiver for a 4-by-4 MIMO communications system employing carrier recovery, according to an embodiment of the present invention.

In order to recover the transmitted symbols s, the received vector r is fed into an equalizer 105 which consist of 16 FIR filters 203, as shown in the block diagram in FIG. 2 illustrating four identical receiver chains 200 in the 4-by-4 LoS MIMO receiver. Let $w_{i,j}$, $i,j \in \{1, 2, 3, 4\}$ denote the state response of the FIR filters 203 in the equalizer 203, then the filter outputs may be defined as, $$x_{i,j} = w_{i,j} r_j \quad (2)$$

wherein the equalizer 105, 203 may apply a Least Mean Square Algorithm (LMS), with a coefficient updating rule defined as, $$w_{k+1} = w_k - \mu r_k^H (w_k r_k - 1 \otimes s_k), \quad (3)$$

wherein μ is the step size.

The equalized communications signal $x_{i,j}$ is then fed into a phase recovery unit 204 wherein at least one of the phase and frequency of the equalized communications signal is adjusted. If $\hat{\phi}_i$ is the estimated phases 208 then the phase recovery of the communications signal may be expressed as, $$y_{i,j} = x_{i,j} e^{-\hat{\phi}_{i,j}}. \quad (4)$$

The phase recovered communications signals $y_{i,j}$ is then combined 107, 205 so as to optimize the signal-to-noise ratio. The combined signal $z_i$, $i \in \{1, 2, 3, 4\}$ is also then fed into a detector (or slicer) 108, 206 wherein symbol detection is carried out based on, for instance, the minimum distance criterion given by, $$\hat{s}_i = \underset{\bar{s}}{\operatorname{argmin}} |s_i - \bar{s}|, \bar{s} \in \frac{\sqrt{2}}{2} \{1+i, 1-i, -1-i, -1+i\}. \quad (5)$$

The estimated symbols $\hat{s}_i$ may then be demodulated 109 into estimated received binary source bits, $\hat{b}_i$.

A typical setup of the carrier recovery 207 in the receiver 200 would be that the carrier recovery 207 tries to estimate the phases necessary for rotation based on the assumption that the equalized communications signals $x_{i,j}$, which is the input signal to the phase rotators 204, are the measurements and the output from the detector 206, being the signal estimates $\hat{s}_i$, is the reference values for the phase estimations $\hat{\phi}_i$ 208. This however assumes that the system after the equalizer 105, 203 is time-synchronous. This might in many cases not be true due to, for instance, the group delay in the channel and the equalizers. Furthermore, the matrices in the system equations may become high dimensional if applying this approach, which would make the phase estimator very computationally demanding. Another requirement would be that the LoS MIMO channel 103 between transmitter and equalizer output is known.

According to an embodiment of the present invention the drawbacks mentioned above may be avoided by letting the equalized communications signal (the rotator inputs) be the input signal to the model based filter 209 and the demodulated signal estimate 210 to be the measurement to the carrier recovery 207. In this way lower-dimensional system matrices can be used in the estimator and thus lower the computational complexity significantly. Furthermore it will no longer be a requirement that the input signals must be time-synchronous. However, an all asynchronous system will in this case result in a slightly increased estimation error. The measurement equation for the carrier recovery 207 will now be given by, $$\hat{s}_k = g(r_k, w_k, \hat{\Phi}_k^r) + n_k^g = z_k + n_k^g \quad (6)$$

wherein $\hat{s}_k$ denotes the demodulated signal, $\hat{\Phi}_k^r$ denotes the estimated phase, $z_k$ denotes the input to the demodulator, and $n_k^g$, denotes additive measurement noise at time instance k.

Other advantages of the present invention described above is that it enables usage of MIMO arrangements with independent oscillators at all antennas, it supports both high phase noise and high modulation order, and that the concept is very simple to extend to arbitrary antenna arrangements.

Figure 3A:
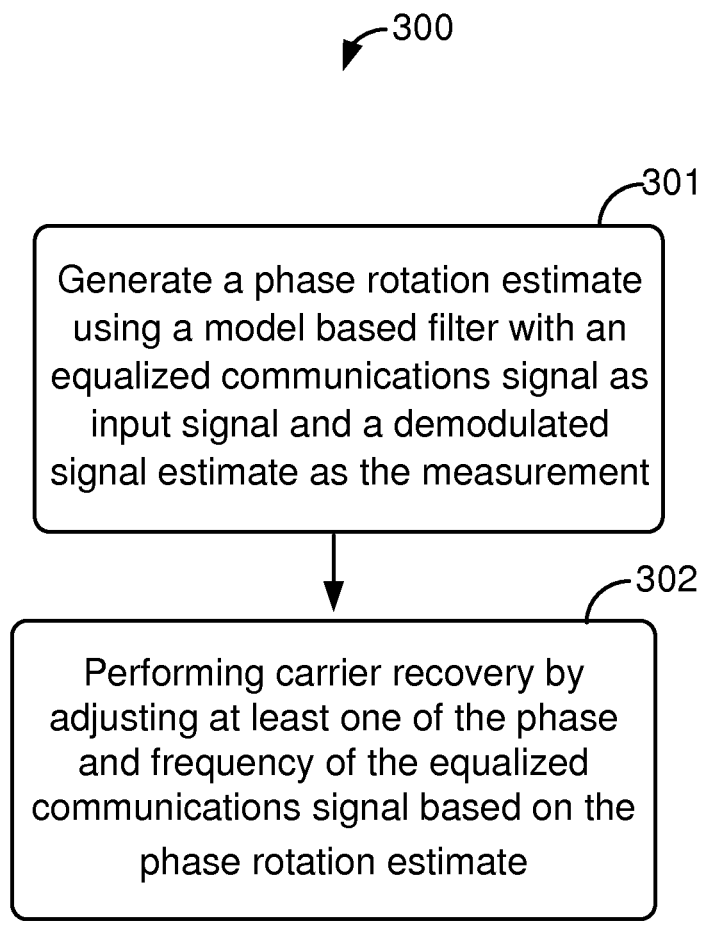
FIG. 3a shows a flowchart describing carrier recovery according to an embodiment of the present invention.

The carrier recovery unit 207 may in an embodiment of the present invention be realized using a model based filter, and the steps of the present invention may be summarized as shown in the flowchart 300 in FIG. 3a. In the first step 301a phase rotation estimate 208 is generated using a model based filter with the equalized communications signal as input signal to the model based filter in the carrier recovery unit 207 and the demodulated signal estimate as a measurement to the model based filter in the carrier recovery unit 207. In the second step 302 the carrier recovery is performed by adjusting at least one of the phase and frequency of the equalized communications signal based on the phase rotation estimate 208, resulting in a carrier recovered communications signal.

The model based filter utilized in the carrier recovery 207 may be implemented in a number of different ways. If a linear model based filter is chosen for implementation (note that the coefficient calculation still can be non-linear) the filter coefficients of model based filter may be calculated based on different criteria. Mean Square Error (MSE) minimizing approaches suitable for usage is for instance non-linear Kalman filtering such as extended Kalman filtering (EKF) and unscented Kalman filtering (UKF), a Recursive Least Square approach, and Least Mean Square with projection approach. Other non-linear filters which could be used are for example radial basis function networks, and also particle filters.

The model based filter in the carrier recovery 207 may in an embodiment of the present invention be implemented using an extended Kalman filter (EKF). The EKF is essentially a nonlinear version of the standard Kalman filter which linearizes about the current mean and covariance. As in the case with the Kalman filter, the EKF may be characterized using a "predict step" and an "update step", wherein the predict step uses the state estimate from the previous time step to produce an estimate of the state at the current time step, while in the update step the current a-priori prediction is combined with current observation information to refine the state estimate. In a first embodiment of the present invention the EKF may be used for phase error recovery only.

In a N×M MIMO system, wherein N is the number of transmit antennas and M is the number of receive antennas, with independent oscillators at all antennas, a receiver can not estimate all N·M oscillator phases since the system is underdetermined. However, it is not necessary to estimate all N·M phases for detecting a transmitted signal. For the receiver in the present invention it is sufficient to know N·M−1 phases in a space spanned by the N·M original uncorrelated oscillator phases to determine a transmitted signal, since the N·M−1 phases which need to be estimated are not uncorrelated anymore. The NM−1 estimated phases are denoted as $\tilde{\phi}$, which can be used to compute the phases $\hat{\phi}$ 208 needed to determine the transmitted signal. Then, at time instant k the model for the phase process at the transmitter/receiver is given by, $$\tilde{\phi}_k = \tilde{\phi}_{k-1} n_k^{\tilde{\phi}} \qquad (7)$$

wherein the driving noise $n_k^{\tilde{\phi}}$ of is a white zero mean, Gaussian random variable, and the measurement equation is given by $$\hat{s}_k = g(Y_k, \hat{\tilde{\phi}}_k^r) \qquad (8)$$

The predicted phase vector $\hat{\tilde{\phi}}_{k|k-1}$ and the prediction error matrix $P_{k|k-1}$ may then be computed as, $$\hat{\tilde{\phi}}_{k|k-1} = \hat{\tilde{\phi}}_{k-1|k-1} \qquad (9)$$

$$P_{k|k-1} = P_{k-1|k-1} + Q^{\tilde{\phi}} \qquad (10)$$

while in the updating step, the estimate $\hat{\tilde{\phi}}_{k|k}$ and the estimation error matrix $P_{k|k}$ are computed as, $$\hat{\tilde{\phi}}_{k|k} = \hat{\tilde{\phi}}_{k|k-1} + K_k \epsilon_k \qquad (11)$$

$$P_{k|k} = (I - K_k \Pi_k) P_{k|k-1} \qquad (12)$$

where I is the identity matrix, and the error correction vector $\epsilon_k$ and the Kalman gain $K_k$ is given by, $$\epsilon_k = \hat{s} - g(Y_k, \hat{\tilde{\phi}}_{k|k-1}) \qquad (13)$$

$$K_k = P_{k|k-1} \prod_k^H \left( \left( \prod_k P_{k|k-1} \prod_k^H + Q^g \right) \right)^{-1} \qquad (14)$$

$$\prod_k = \frac{\partial g(Y_k, \hat{\tilde{\phi}}_k)}{\partial \hat{\tilde{\phi}}_k} \qquad (15)$$

Typically, the prediction and the update steps alternate, with the prediction advancing the state until the next scheduled observation, and the update incorporating the observation.

In practice, the receiver may not have access to $\tilde{\phi}$, however, the predicted phase $\hat{\tilde{\phi}}_{k|k-1}$, computed using a Kalman filter, may instead be used to recovery the phase. The Kalman filter may then compute the estimated phase $\hat{\tilde{\phi}}_{k|k}$ based on the decision $\hat{s}_k$. Observe that the model is still useful if the phase estimate is close to the true value.

In a second embodiment of the present invention EKF may be used both for phase and frequency recovery. The model of phase error and frequency offset, which is assumed identical for all the transmitter and receiver oscillators, is then given by, $$\tilde{\phi}_k = \tilde{\phi}_{k-1} + \tilde{\delta}_k + n_k^{\tilde{\phi}} \qquad (16)$$

$$\tilde{\delta}_k = \tilde{\delta}_{k-1} + n_k^{\tilde{\delta}} \qquad (17)$$

wherein $\tilde{\phi}_k$ and $\tilde{\delta}_k$ are the modified phase and frequency offsets, respectively, and the noise terms $n_k^{\tilde{\phi}}$ and $n_k^{\tilde{\delta}}$ mare additive Gaussian white noise. The equations (16) and (17) can be written in a more compact form as, $$\underbrace{\begin{bmatrix} \tilde{\phi}_k \\ \tilde{\delta}_k \end{bmatrix}}_{Y_k} = \underbrace{\begin{bmatrix} I & I \\ 0 & I \end{bmatrix}}_{F} \underbrace{\begin{bmatrix} \tilde{\phi}_{k-1} \\ \tilde{\delta}_{k-1} \end{bmatrix}}_{Y_{k-1}} + \underbrace{\begin{bmatrix} n_k^{\tilde{\phi}} + n_k^{\tilde{\delta}} \\ n_k^{\tilde{\delta}} \end{bmatrix}}_{n_k^Y}. \qquad (18)$$

The measurement equation is still the same as in the case where only the phase recovery is performed, see equation (7). The prediction step may in this case be computed as, $$\gamma_{k|k-1} = F \gamma_{k-1|k-1} \qquad (19)$$

$$P_{k|k-1} = F P_{k-1|k-1} F^H + Q^\gamma \qquad (20)$$

while the update step may be computed as, $$\epsilon_k = \hat{s} - g(Y_k, \hat{\tilde{\phi}}_{k|k-1}) \qquad (21)$$

$$\gamma_{k|k} = \gamma_{k|k-1} + K_k \epsilon_k \qquad (22)$$

$$P_{k|k} = (I - K_k \Pi_k) P_{k|k-1} \qquad (23)$$

where I is the identity matrix, and the error correction vector $\epsilon_k$ and the Kalman gain $K_k$ is given by, $$K_k = P_{k|k-1} \prod_k^H \left( \left( \prod_k P_{k|k-1} H_k^H + Q^g \right) \right)^{-1} \qquad (24)$$

$$\prod_k = \frac{\partial g(Y_k, \hat{\tilde{\phi}}_k)}{\partial Y_k}. \qquad (25)$$

In an embodiment of the present invention the EKF based system may further be improved by utilizing so called smoothing. In the proposed phase recovery schemes above, the predicted phase, computed by the (forward) extended Kalman filter, may further be enhanced by phase smoothing generated by additionally applying a (backward) Kalman smoother filter which exploits both previous and future observations. The Kalman smoother may be implemented as follows $$\gamma_{k\backslash n} = \tilde{F}_k \gamma_{k+1\backslash n} K_k \gamma_{k+1\backslash k} \quad (26)$$

$$\tilde{F}_k = F^{-1}(I - Q^\gamma P_{k+1\backslash k-1}) \quad (27)$$

$$K_k = F^{-1} Q^\gamma P_{k+1\backslash k}^{-1} \quad (28)$$

A drawback with the Kalman smoothing as described in equations (26)-(28) is that a matrix inversion has to be performed. Matrix inversions are computationally demanding operation especially in real-time applications.

A way to avoid the matrix inversion in the Kalman smoother is to use a Modified Bryson-Frazier smoother instead. In the Modified Bryson-Frazier Smoother $\gamma_{k\backslash n}$ is updated as, $$\gamma_{k\backslash n} = \gamma_{k\backslash k} - P_{k\backslash k} \hat{\lambda}_k \quad (29)$$

$$\hat{\lambda}_k = F \tilde{\lambda}_{k+1} \quad (30)$$

$$\tilde{\lambda}_k = -\Pi_k^H (\Pi_k P_{k\backslash k-1} \Pi_k^H + Q^g)^{-1} \epsilon_k + (I - K_k \Pi_k) \hat{\lambda}_k \quad (31)$$

$$\hat{\lambda}_n = 0. \quad (32)$$

However, performing smoothing over an entire sequence can still be quite computationally demanding. In a variant of the above embodiment of the present invention, fixed-point smoothing may be used to reduce the computational load. In fixed-point smoothing, the smoothing is performed backwards, starting from the last sample to the first sample, on a batch of signal of length n. This means that $\gamma_{k\backslash n}$ is computed from k=1, 2, . . . , n−1, and thus reducing the computational load considerably.

In yet another variant of the above embodiment of the present invention, fixed-lag smoothing may be used to reduce the computational load. In fixed-lag smoothing the smoothing is performed in a moving window of length L, wherein at each time instance t, $\gamma_{t-L+1\backslash t}$ is computed using the latest L symbols, and thus reducing the computational load considerably.

Figure 3B:
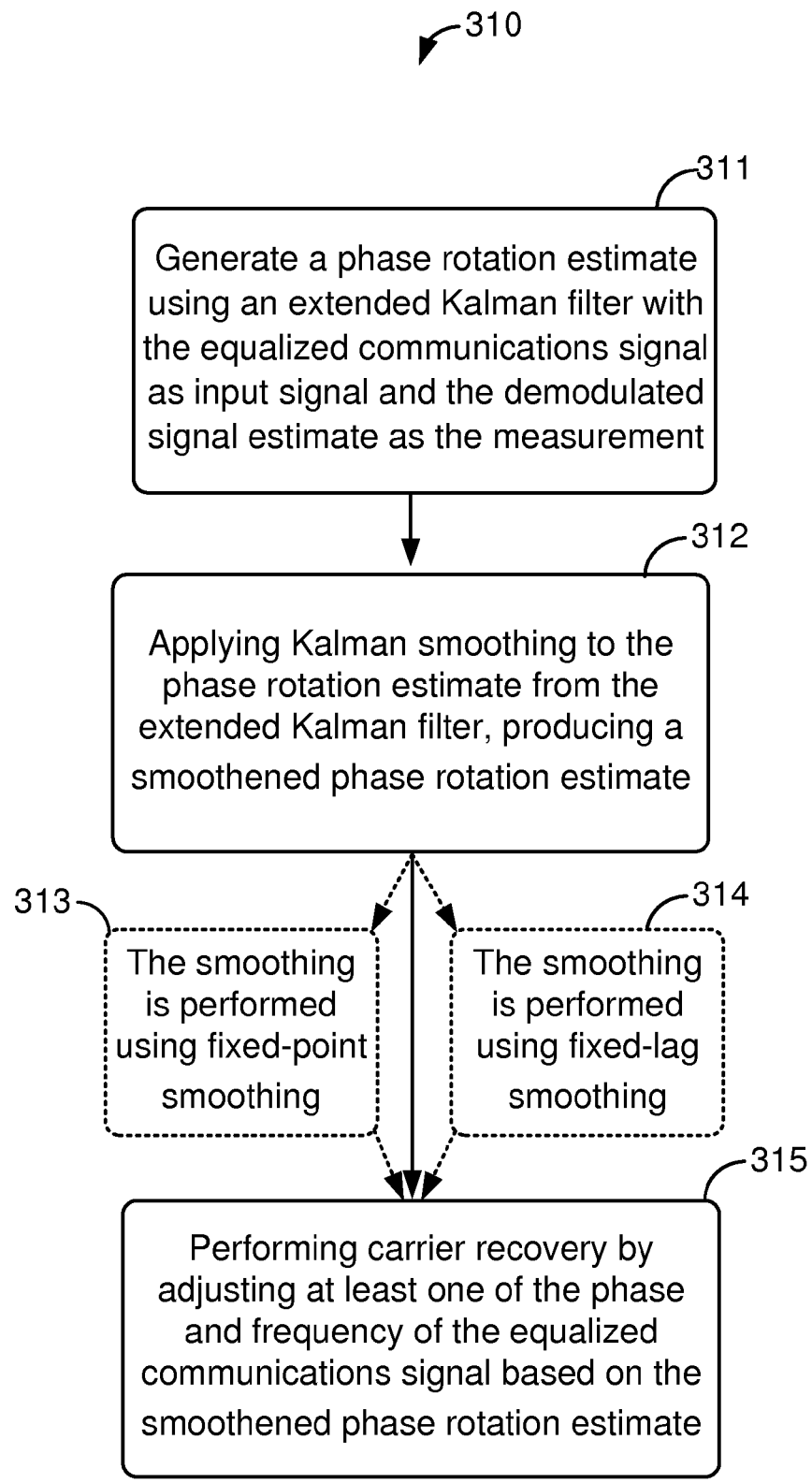
FIG. 3b shows a flowchart describing a variant of the carrier recovery according to an embodiment of the present invention.

FIG. 3b shows a flowchart 300 of the present invention implemented using extended Kalman filtering with applied Kalman smoothening. In the first step 311a phase rotation estimate is generated using an extended Kalman filter with the equalized communications signal as input signal and the demodulated signal estimate as the measurement. In the next step 312 Kalman smoothing is applied to the phase rotation estimate generated in step 311 by producing a smoothened phase rotation estimate. The smoothening process may optionally (hence the jagged lines) be performed using fixed-point smoothing as in step 313 or alternatively performed using fixed-lag smoothing as in step 314. When smoothened phase rotation estimates have been generated, carrier recovery by adjusting at least one of the phase and frequency 315 of the equalized communications signal based on the smoothened phase rotation estimate can be performed.

Figure 4A:
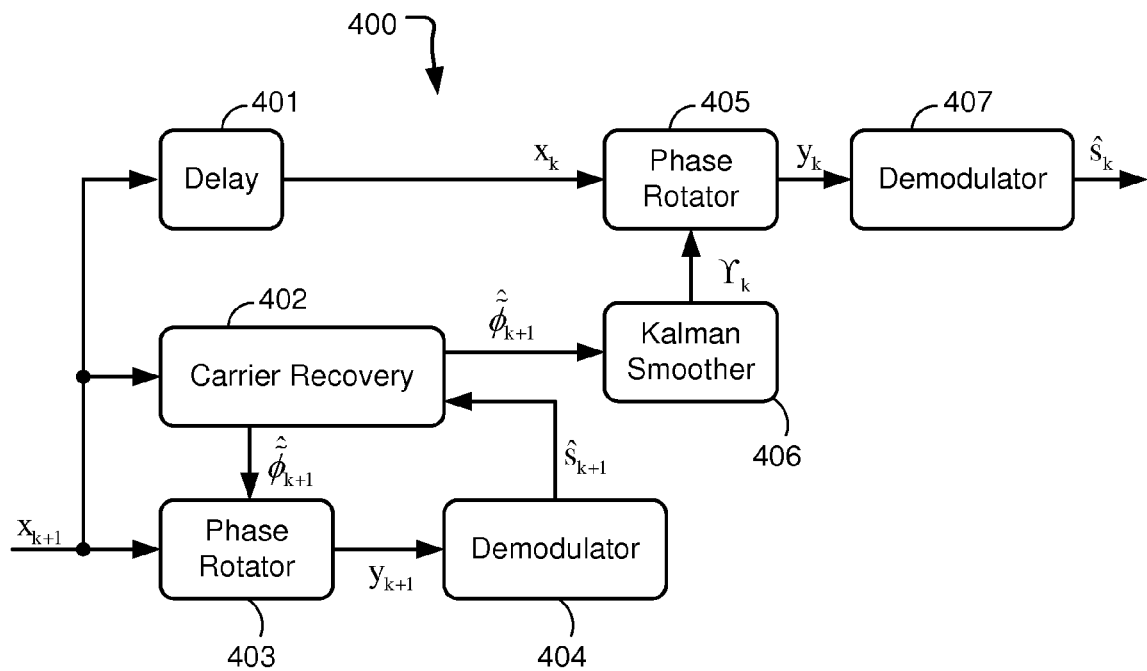
FIG. 4a shows a block diagram of the carrier recovery using smoothing according to an embodiment of the present invention.

FIG. 4a shows a block diagram of the present invention implemented using extended Kalman filtering with applied Kalman smoothening 400. A received equalized communications signal is applied to the carrier recovery 402, to the phase rotator 403 and to a delay element 401. The carrier recovery generates a phase rotation estimate from the equalized communications signal and a demodulated signal estimate from the demodulator 404, which then is applied to the phase rotators 403. The phase rotators 403 adjust one of the phase and frequency of the equalized communications signal, producing a carrier recovered communications signal which is fed into the demodulator 404 for producing a new demodulated signal estimate. The phase rotation estimate produced in the carrier recovery 402 is also feed to a Kalman smoother 406 as a-priori information for producing an improved phase rotation estimate. The Kalman smoother 406 then performs smoothening 406 as described by equations (26)-(28) on the inputted phase rotation estimate resulting in an improved phase rotation estimate. The smothered improved phase rotation estimate is then fed into a second phase rotator 405 wherein the phase and/or the frequency offset of the delayed 401 equalized communications signal can be adjusted. The adjusted communication signal is then fed to a demodulator 407, producing an improved demodulated signal estimate.

In yet another embodiment of the present invention delayed estimation may be utilized. If the transmitted and received communications signal contains known symbols, such as pilot symbols, then the symbols can be utilized for enhancing the performance of the carrier recovery. In delayed estimation two model based filters are used to perform the carrier recovery. The task of the first carrier recovery is to make an approximate carrier phase estimate. The main focus is to get a rough phase estimates so as to prevent the phase recovery from diverging. During the phase estimation certain symbols, which can be pilots or other reliably detected symbols, the phase estimates are stored. The reliable phase estimates are then used by a second carrier recovery, which processes a delayed version of the input signal to the first carrier recovery, as a-priori information in the prediction stage. Divergence is in this way avoided since the estimation is locked to the reliable estimates of the first carrier recovery by the incorporation of the estimates in the prediction stage. In an embodiment of the present invention the model based filters in the two carrier recovery are implements using extended Kalman filters. However, the invention is not limited to using only extended Kalman filters, but may use any combination of suitable model based filters mentioned above.

Figure 3C:
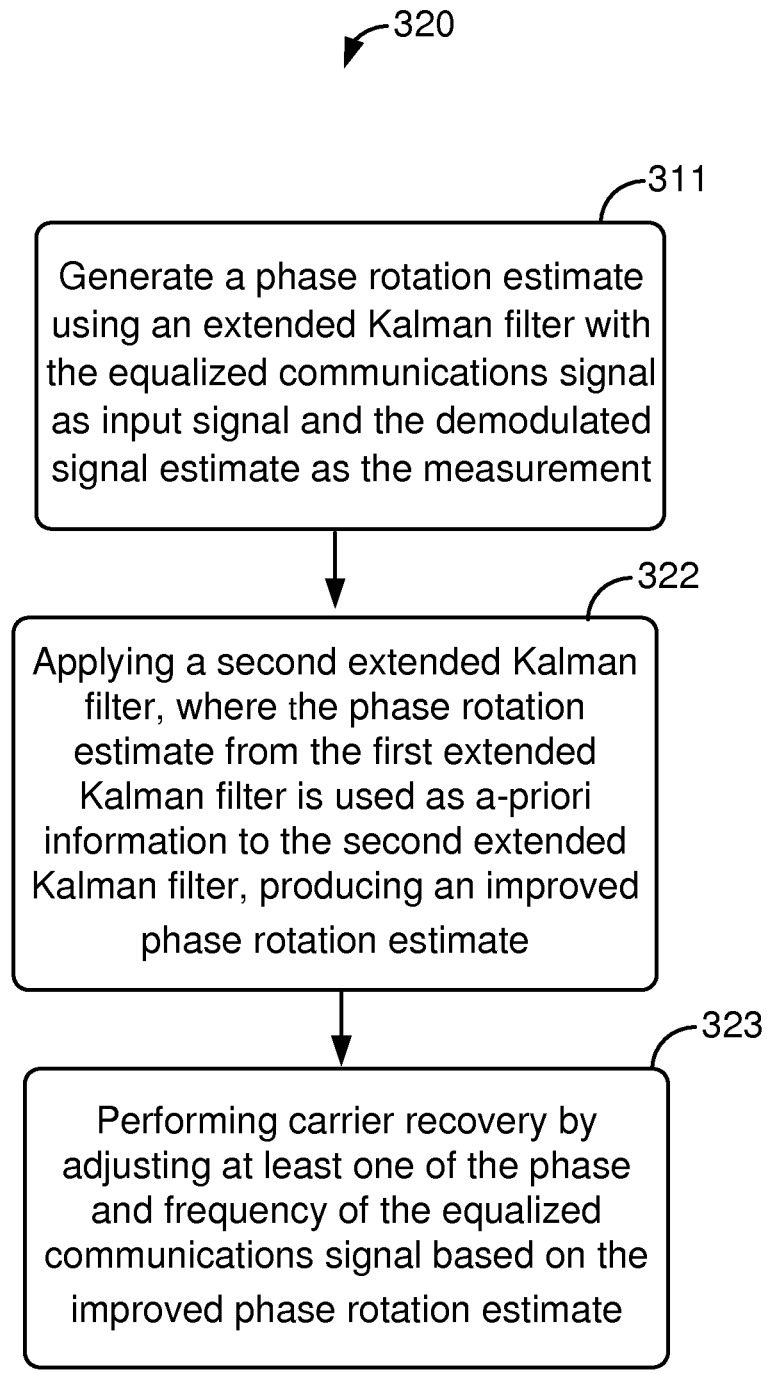
FIG. 3c shows a flowchart describing a yet another variant of the carrier recovery according to an embodiment of the present invention.

FIG. 3c shows a flowchart 310 of the present invention implemented using delayed estimation with extended Kalman filters. In the first step 311a phase rotation estimate is generated using an extended Kalman filter with the equalized communications signal as input signal and the demodulated signal estimate as the measurement. In the next step 322 a second extended Kalman filter is applied, where the phase rotation estimate from the first extended Kalman filter is used as a-priori information to the second extended Kalman filter, producing an improved phase rotation estimate. In the nest step 323 carrier recovery is performed by adjusting at least one of the phase and frequency of the equalized communications signal based on the improved phase rotation estimate.

Figure 4B:
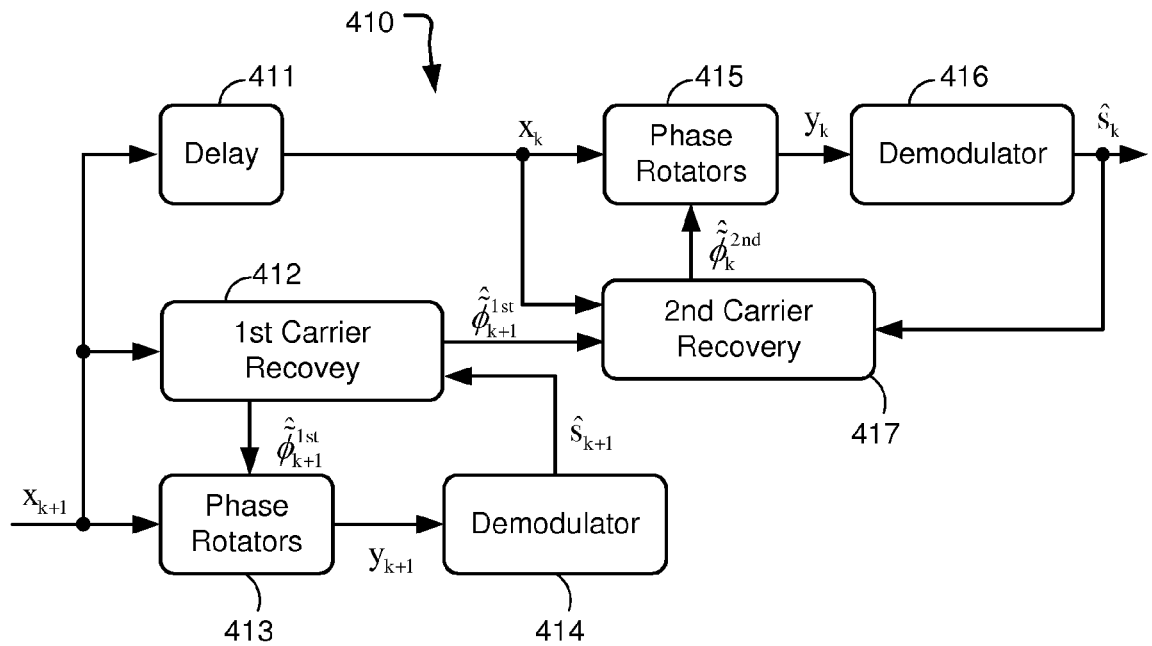
FIG. 4b shows a block diagram of the carrier recovery using delayed estimation according to an embodiment of the present invention.

FIG. 4b shows a block diagram 400 of the present invention implemented using delayed estimation implemented using a first carrier recovery 412 and a second carrier recovery 417. A received equalized communications signal is applied to the first carrier recovery 412, to the phase rotator 413 and to a delay element 411. The first carrier recovery generates a phase rotation estimate (marked $1^{st}$ in FIG. 4b) from the equalized communications signal and a demodulated signal estimate from the demodulator 414, which then is applied to the phase rotators 413. The phase rotators 413 adjust one of the phase and frequency of the equalized communications signal, producing a carrier recovered communications signal which is fed into the demodulator 414 for producing a new demodulated signal estimate. The some or all of the first phase rotation estimates produced in the first carrier recovery 412 is inputted to the second carrier recovery 417 and used as a-priori information for producing an improved phase rotation estimate (marked as $2^{nd}$ in FIG. 4b). The improved phase rotation estimate from the second carrier recovery 417 is then fed into a second phase rotator 415 wherein the phase and/or the frequency offset of the delayed 411 equalized communications signal can be adjusted. The adjusted communication signal is then fed to a second demodulator 417, producing an improved demodulated signal estimate.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and will not be interpreted in an idealized or overly formal sense unless expressly so defined herein.

The foregoing has described the principles, preferred embodiments and modes of operation of the present invention. However, the invention should be regarded as illustrative rather than restrictive, and not as being limited to the particular embodiments discussed above. The different features of the various embodiments of the invention can be combined in other combinations than those explicitly described. It should therefore be appreciated that variations may be made in those embodiments by those skilled in the art without departing from the scope of the present invention as defined by the following claims.

The invention claimed is:

1. A method for carrier recovery of an equalized communications signal in a multiple-input multiple-output (MIMO) communications system, the method comprising:
   generating a phase rotation estimate from the equalized communications signal and a demodulated signal estimate of the equalized communications signal;
   adjusting at least one of the phase and frequency of the equalized communications signal based on the phase rotation estimate;
   wherein the generating the phase rotation estimate comprises using a first model based filter, with the equalized communications signal as input signal to the first model based filter and the demodulated signal estimate as a measurement to the first model based filter.

2. The method of claim 1, wherein the first model based filter is realized using a first extended Kalman filter.

3. The method of claim 2, further comprising generating a smoothed phase rotation estimate as the phase rotation estimate by applying a smoother to the extended Kalman filter.

4. The method of claim 3, wherein the applying a smoother to the extended Kalman filter comprises using fixed-point smoothing.

5. The method of claim 3, wherein the applying a smoother to the extended Kalman filter comprises using fixed-lag smoothing.

6. The method of claim 1:
   further comprising applying a second model based filter to the first model based filter, wherein the phase rotation estimate from the first model based filter is used as a-priori information to the second model based filter;
   the second model based filter producing an improved phase rotation estimate as the phase rotation estimate used for the adjusting.

7. The method of claim 6, wherein the second model based filter is realized using a second extended Kalman filter.

8. The method of claim 1, wherein the first model based filter is realized using one of:
   an unscented Kalman filter approach;
   a Least Mean Squares with projection approach;
   a Recursive Least Squares approach.

9. The method of claim 1, wherein the MIMO communications system is a line-of-sight MIMO communications system.

10. An apparatus for carrier recovery of an equalized communications signal in a multiple-input multiple-output (MIMO) communications system, comprising:
    a generating circuit configured to generate a phase rotation estimate from the equalized communications signal and a demodulated signal estimate of the equalized communications signal;
    an adjusting circuit configured to adjust at least one of the phase and frequency of the equalized communications signal based on the phase rotation estimate;
    wherein the generating circuit comprises a first model based filter circuit, with the equalized communications signal as input signal to the first model based filter unit and the demodulated signal estimate as a measurement to the first model based filter unit.

11. The apparatus of claim 10, wherein the first model based filter circuit comprises an extended Kalman filter circuit.

12. The apparatus of claim 11, further comprising a smoother circuit configured to:
    smooth the phase rotation estimate generated by the extended Kalman filter circuit; and
    output a smoothened phase rotation estimate as the phase rotation estimate.

13. The apparatus of claim 12, wherein the smoother circuit is configured to utilize fixed-point smoothing.

14. The apparatus of claim 12, wherein the smoother circuit is configured to utilize fixed-lag smoothing.

15. The apparatus of claim 10:
    wherein the generating circuit further comprises a second model based filter circuit configured to receive the phase rotation estimate from the first model based filter circuit and use the received phase rotation estimate as a-priori information for the second model based filter circuit;
    wherein the second model based filter circuit is configured to produce an improved phase rotation estimate as the phase rotation estimate.

16. The apparatus of claim 15, wherein the second model based filter circuit comprises a second extended Kalman filter.

17. The apparatus of claim 10, wherein the first model based filter circuit is configured to use one of:
    an unscented Kalman filter approach;
    a Least Mean Squares with projection approach;
    a Recursive Least Squares approach.

18. The apparatus of claim 10, wherein the apparatus is configured to be used in a line-of-sight MIMO communications system.

* * * * *

UNITED STATES PATENT AND TRADEMARK OFFICE
CERTIFICATE OF CORRECTION

PATENT NO. : 8,982,982 B2
APPLICATION NO. : 14/116364
DATED : March 17, 2015
INVENTOR(S) : Andreas Wolfgang et al.

It is certified that error appears in the above-identified patent and that said Letters Patent is hereby corrected as shown below:

In the specification

In Column 2, Line 67, delete "recovery; and" and insert -- recovery; --, therefor.

In Column 3, Line 3, delete "invention; and" and insert -- invention; --, therefor.

In Column 3, Line 5, delete "invention; and" and insert -- invention; --, therefor.

In Column 3, Line 8, delete "invention; and" and insert -- invention; --, therefor.

In Column 3, Line 10, delete "invention; and" and insert -- invention; --, therefor.

In Column 4, Line 44, after Equation (6), insert -- , --.

In Column 4, Line 47, delete "$\mathrm{n}_k^g$," and insert -- $n_k^g$ --, therefor.

In Column 5, Line 41, delete "$\mathrm{n}_k^{\bar{\Phi}}$ of is," and insert -- $n_k^{\tilde{\phi}}$ is--, therefor.

In Column 5, Line 45, after Equation (8), insert -- . --.

In Column 6, Line 52, delete "$P_{k|k}=(I-K_k\Pi_k)P_{k|k-1}(23)$" and insert -- $P_{k|k} = (I - K_k\Pi_k)P_{k|k-1}$    (23) --, therefor.

In Column 7, Line 8, delete "$\tilde{F}_k = F^{-1}(I - Q^{\Upsilon} P_{k+1|k-1})$    (27)" and insert -- $\tilde{F}_k = F^{-1}(I - Q^{\Upsilon} P_{k+1|k}^{-1})$    (27) --, therefor.

Signed and Sealed this
Ninth Day of February, 2016

Michelle K. Lee
*Director of the United States Patent and Trademark Office*

CERTIFICATE OF CORRECTION (continued)
U.S. Pat. No. 8,982,982 B2

In the specification

In Column 7, Line 21, delete "$\Upsilon_{k|n} = \Upsilon_{k|k} - P_{k|k}\hat{\lambda}_k$" and insert --
$$\Upsilon_{k|n} = \Upsilon_{k|k} - P_{k|k}\hat{\lambda}_k \qquad (29)$$
--, therefor.